Patented Sept. 26, 1939

2,174,027

UNITED STATES PATENT OFFICE 2,174,027

WELL-DRILLING FLUID

Robert J. Ball, Los Angeles, Calif.

No Drawing. Application April 19, 1937,
Serial No. 137,766

2 Claims. (Cl. 255—1)

This invention relates to the drilling and controlling of oil and gas wells in which a drilling fluid is circulated down through the drill string, around the drill, thereby lubricating the drill, and up the hole carrying with it the cuttings produced in drilling.

In the use of ordinary drilling fluids, different difficulties arise as different types of drilling formations are encountered in the course of drilling. For example, in drilling in broken formations, containing crevices and cavities, and loose, porous formations, circulation is frequently lost with the result that cuttings accumulate around the bit. In drilling in loose, sandy formations, material continually falls into the hole, sometimes completely filling the hole and thereby sticking the drill string. In drilling in heaving shale-formations, the water from the drilling fluid penetrates into the formation and partially dissolves it, causing the walls of the hole to swell, and frequently cave, making it impossible to set the casing or reach the bottom of the hole, and sometimes results in the loss of the hole.

One of the objects of my invention is to provide a drilling fluid by the use of which the above and other disadvantages are eliminated.

Another object of my invention is to provide an improved compound for the chemical treatment of drilling fluids in order to give the drilling fluid better wall building and sealing properties.

Another object of my invention is to provide a method by means of which a fibrous material consisting of long stringy chemical fibers is produced in situ.

Another object of my invention is to provide a compound for cementing wells.

Other and further objects will appear from the specification, in which one example of my invention is disclosed.

A mixture composed approximately as follows is made:

| | Per cent |
|---|---|
| 40° Baumé calcium chloride solution | 25 |
| Sodium alginate, colloidal solution made by dissolving approximately 8 pounds of commercial sodium alginate in 50 gallons of water | 75 |

The colloidal sodium alginate reacts with the calcium chloride to form a fibrous material consisting of long stringy chemical fibers. Approximately 3 to 15 per cent of this mixture is mixed with the drilling fluid that is used at the well, the amount depending upon the type and condition of the drilling fluid, and the formation being drilled.

The chemical fibers are carried by the drilling fluid into the formation and the film that covers the wall of the hole. These chemical fibers thoroughly bind the loose, heaving or caving formations together, and in a few hours set into a solid impervious body that effectively supports the wall of the hole and prevents the fluid in the formation from entering the hole. Once set, the alginates are insoluble in water.

The chemical fibers also penetrate into and seal off all porous formations, crevices, and cavities, and thereby prevent the loss of circulation.

In the event that ordinary drilling fluids have been used and circulation is lost, circulation may be quickly regained by the use of a drilling fluid containing the compound of my invention in that the strong chemical fibers seek out and fill the large crevices and cavities as well as seal off the fine pores of sandy formations.

The chemical fibers also prevent excessive penetration of the drilling fluid into potentially productive formations, in that they seal all sands contacted. This also prevents the exchange of fluid from one formation into another.

In difficult formations, instead of introducing the alginate mixture into the drilling fluid, I have found it advantageous to produce the chemical fibers in situ.

One way of accomplishing this result is by pumping several barrels of sodium alginate into the hole. The drill pipe is then raised approximately 85 feet and ordinary drilling fluid is pumped into the hole, which fluid lays on top of the colloidal sodium alginate. The drill pipe is then lowered to the first position and sufficient calcium chloride is pumped into the hole to react with all of the sodium alginate. In the case of formations containing many large cavities, it is sometimes necessary to repeat these operations a number of times. Instead of using sodium alginate, alginic acid or any soluble alginate such as ammonium alginate or potassium alginate may be used.

Although I prefer to use calcium chloride to precipitate the alginate, any salt containing a polyvalent ion can be used, such as calcium chloride, aluminum sulfate, iron chloride, etc.

In addition to using the compound for the chemical treatment of drilling fluids, it may be used to cement off oil, gas, and water wells. In order to accomplish this result, I prefer to produce the chemical fibers in situ. A mixture is made of approximately 90% cement and 10% sodium alginate solution, and this mixture is pumped into the hole. I then pump in a sufficient amount of calcium chloride solution to react with all of the sodium alginate. In this manner long stringy chemical fibers are formed in situ. In other cases I have used from 5% to 20% of sodium alginate solution, depending upon the various conditions encountered.

In the claims I have used the term "chemical fibers" to include all fibers which are produced by the reaction of chemical compounds, but not to include fibers of cellulose, such as wood, beet or cotton.

Although I have described my invention with respect to certain particular embodiments thereof, nevertheless I do not desire to be limited to the particular details shown and described except as clearly specified in the appended claims, since many changes, modifications and substitutions may be made without departing from my invention in its broader aspects, which may be found useful in many other applications thereof.

I claim:

1. A method of sealing off wells which consists of introducing a soluble alginate into the well, and then introducing into the well a compound which will react with the soluble alginate to form an insoluble alginate in situ.

2. In the drilling of oil and gas wells with the aid of a mud circulation, the process which comprises adding to such a circulation alginic acid or a salt of said acid.

ROBERT J. BALL.